United States Patent [19]
Otto

[11] 3,807,040
[45] Apr. 30, 1974

[54] METHOD OF ASSEMBLING A DYNAMOELECTRIC MACHINE STATOR

[75] Inventor: Charles W. Otto, Dekalb, Ill.

[73] Assignee: General Electric Company, Fort Wayne, Ind.

[22] Filed: May 17, 1973

[21] Appl. No.: 361,040

Related U.S. Application Data

[62] Division of Ser. No. 246,315, April 21, 1972.

[52] U.S. Cl.................. 29/596, 29/522, 29/609, 310/42, 310/258
[51] Int. Cl. ............................................. H02k 15/00
[58] Field of Search ............. 29/596, 609, 522, 523; 310/42, 214, 216, 254, 258

[56] References Cited
UNITED STATES PATENTS

| | | | |
|---|---|---|---|
| 3,313,967 | 4/1967 | Ross | 310/254 |
| 1,740,253 | 12/1929 | Lock | 29/522 UX |
| 3,290,077 | 12/1966 | La Barge | 29/522 UX |
| 3,009,073 | 11/1961 | Drabik et al. | 310/214 |
| 3,343,013 | 9/1967 | Wightman et al. | 310/254 X |
| 3,317,981 | 5/1967 | Drees | 29/523 X |
| 1,695,017 | 12/1928 | Kuckuck | 29/522 UX |
| 3,348,300 | 10/1967 | Lindgren | 29/523 X |

FOREIGN PATENTS OR APPLICATIONS 524,344  12/1953  France .............................. 29/522

Primary Examiner—Charles W. Lanham
Assistant Examiner—Carl E. Hall

[57] ABSTRACT

A method of assembling dynamoelectric machine stator components is disclosed. A portion of a plurality of elongated beams having corrugated beam webs from each of which two beam flanges project is inserted into a plurality of grooves having a bottom wall and two confronting side walls in the peripheral surface of the magnetic core with the corrugated beam webs disposed adjacent the core bottom walls and with the beam flanges disposed adjacent the groove side walls. The corrugated beam webs are flattened thereby press fitting at least portions of the beam flanges against the groove side walls. Two end shields may then be secured to the elongated beams.

8 Claims, 5 Drawing Figures

PATENTED APR 30 1974          3,807,040

METHOD OF ASSEMBLING A DYNAMOELECTRIC MACHINE STATOR

CROSS REFERENCE TO RELATED APPLICATION

This is a division of copending application Ser. No. 246,315, filed Apr. 21, 1972.

BACKGROUND OF THE INVENTION

This invention relates generally to dynamoelectric machines, and more particularly to dynamoelectric machine stators and methods of assembling components thereof.

As is well-known in the dynamoelectric machine art, most electric motors and generators comprise a stationary member generally referred to as a stator in which a rotatable member generally referred to as a rotor is rotatably mounted. Typically, the stator comprises a laminated magnetic core having a cylindrical bore in which the rotor resides. The stator typically also comprises two end shields secured to two opposite sides of the core. A bearing is carried by each of the two end shields through which a rotor drive shaft is journalled.

In dynamoelectric machines of the type just described, it is most important that the rotor and stator be assembled during manufacture in proper radial and axial alignment, and that such be done expeditiously and inexpensively. Improper radial alignment results in eccentricity in the annular air gap between the rotor and magnetic core while improper axial alignment produces axial rotor thrust. It is also important that the bearings carried by the two end shields be mutually aligned for bearing longevity.

There has heretofore existed, of course, several different methods of assembling dynamoelectric machines with the machine rotor properly positioned within the stator core and with the rotor supporting bearings mutually aligned along a common axis. For example, stator components have been bolted to bearing carrying motor frame members through which bearings the rotor was journalled. Proper radial alignment here is achieved principally through the use of close tolerances during machining assembly members. In other words, proper alignment results from close adherance to dimensional assembly specifications rather than from empirical observation and adjustment. With such methods the tighter the tolerances are held the more accurate the resulting alignment. Unfortunately, the tighter the tolerances the greater also is the cost of assembly.

Another method of assembling stator and rotor has been one in which an oversized, rotor simulator is used which simulator subsequently is substituted by an actual rotor after alignment between the rotor and stator is achieved. Such use of simulator rotors, however, has been limited to "unit bearing" type machines, that is to say dynamoelectric machines in which the rotor is supported at one end only. Thus, such methods have been unavailable for use with the great majority of dynamoelectric machines wherein the rotor is supported at both ends of the shaft.

In 1965 U.S. Pat. No. 3,165,816 issued titled "Method of Manufacturing Dynamoelectric Machines" which disclosed a new approach to assembling dynamoelectric machines. Here, removable positioning means such as shims are arranged in the air gap between rotor and stator core. Two bearing supports are positioned adjacent a surface of other stator members including the magnetic core and then bonded together with an adhesive bonding material such as a thermosetting resin thereby securing the stator assemblies together upon curing of the adhesive and removal of the positioning means. Though this method has yielded good alignment without the expense necessitated by maintenance of very close tolerances, the problems generally associated with the use of adhesives have, of course, been present.

In assembly of the stator core itself, a predetermined number of thin magnetic laminations are juxtaposed to form a stack. Through assembly error, it often happens that the number of juxtaposed laminations differs slightly from this predetermined number. In other cases it is purposely desirable to alter the predetermined number itself. The configuration of most dynamoelectric machine stators either structurally limits such deviations or the deviations present create undesired functional properties in the machine.

Accordingly, it is a general object of the present invention to provide an improved method of assembling components of a dynamoelectric machine stator.

More specifically, it is an object of the invention to provide an improved method of assembling a rotor bearing carrying stator end shield to a stator core.

Another object of the invention is to provide a method of expeditiously and inexpensively assembling a rotor bearing carrying stator end shield to a stator core.

SUMMARY OF THE INVENTION

In carrying out objects of this invention in one form, a method of assembling dynamoelectric machine stator components is provided. A portion of a plurality of elongated beams having corrugated beam webs from each of which two beam flanges project is inserted into plurality of grooves having a bottom and two confronting side walls in the peripheral surface of a magnetic core with the corrugated beam webs disposed adjacent the groove bottom walls and with the beam flanges disposed adjacent the groove side walls. The corrugated beam webs are flattened thereby press fitting at least portions of the beam flanges against the groove side walls. Two end shields may then be secured to the elongated beams.

DETAILED DESCRIPTION OF THE DRAWING

Figure 1:
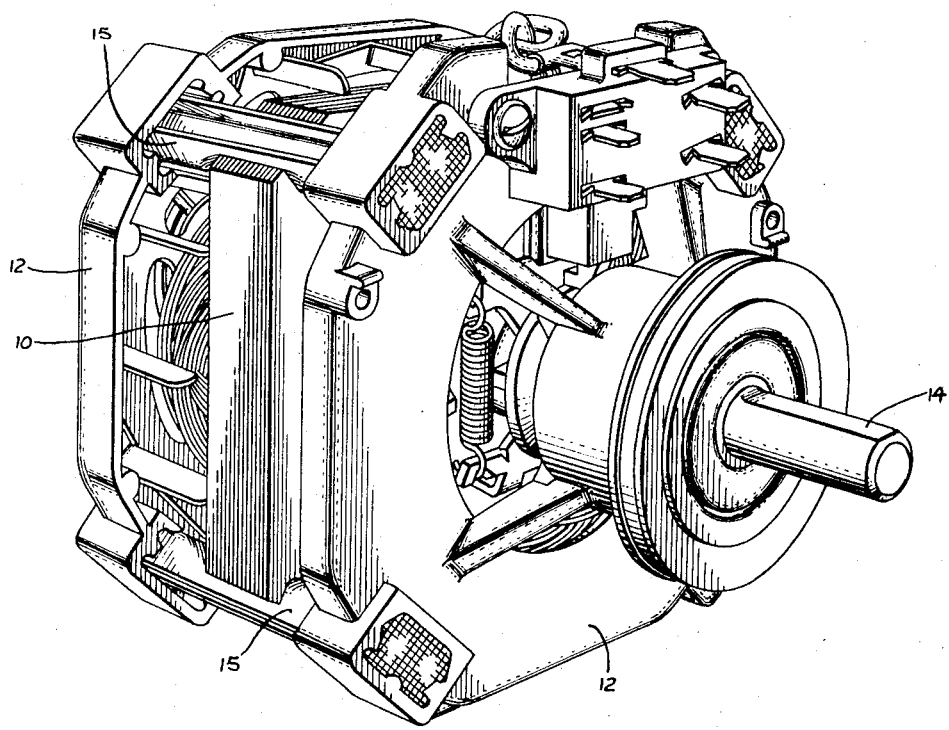
FIG. 1 is a perspective view of an electric motor having a dynamoelectric machine stator which may be assembled by utilization of principles of a method of the present invention.

Referring now in more detail to the drawing, there is shown in FIG. 1 a dynamoelectric machine, such as an electric motor, having a stationary member, such as a stator or magnetic core 10, and opposite structural members, such as a pair of rotor bearing carrying end shields 12 in which a rotor shaft 14 is journalled. Four generally U-shaped beams 15 are rigidly mounted to the core and to the two end shields thereby rigidly securing these stator components together with a rotor connected with rotor shaft 14 rotatably disposed within stator core 10. While beams 15 are described and shown as generally U-shaped in cross-section, other elongate beams of various other configurations or cross-sections as well known in the art and having integrally connected base wall and side wall portions may be alternatively employed in the constructions and method disclosed herein and are contemplated as being within the scope of the invention.

With reference now to FIGS. 2-5, the stator core and beams assembly may be seen in greater detail. In assembling the stator core a plurality of magnetic laminations 16 are juxtaposed to form a stack. The core has a cylindrical bore having a bore axis 18 in which bore a rotor may subsequently be mounted for rotation with respect to the core and with the rotor axis being substantially coincident with core axis 18. The outer peripheral surface of the laminated core has four means for mounting beams 15, such as openings or grooves 20, communicating between opposite side or end faces 20a of the core. Each of these grooves has two confronting side walls 21 which converge slightly as they extend from groove bottom or base wall 23. The groove bottom wall has a longitudinally extending recess 25 therein.

Figure 3:
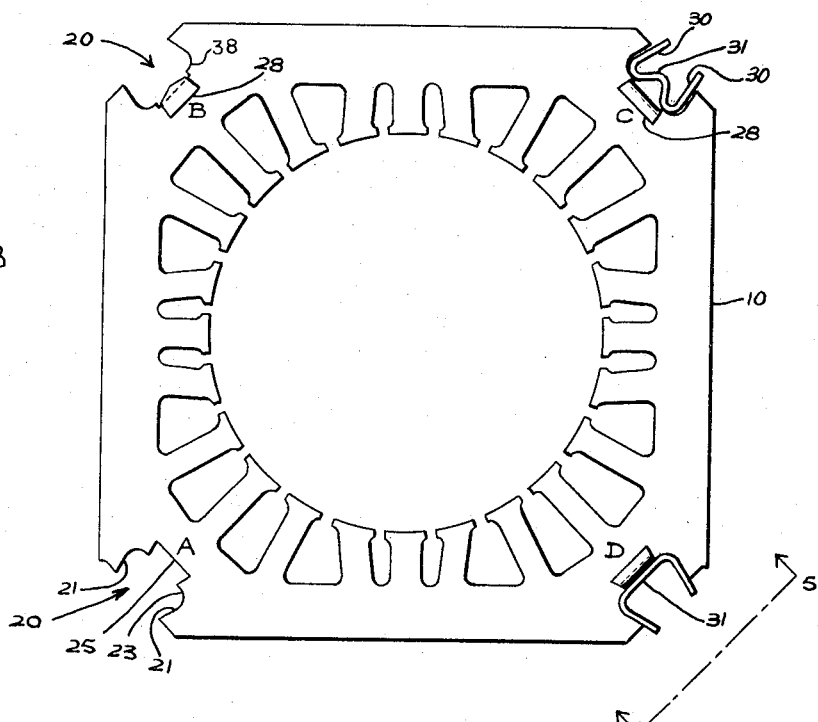
FIG. 3 is a side view in elevation of the stator core component shown in FIG. 2 portions of which are shown in various stages of assembly with stator components extrinsic to the core.

After magnetic laminations 16 have been juxtaposed to form grooves 20, as seen by groove A in FIG. 3, keys 28 are next set in recesses 25 and formed over groove lips 38 which are defined adjacent the juncture of groove means 20 with stator end faces 20a, as seen most clearly by reference to groove B in FIG. 3. So positioned and formed, keys 28 serve to hold the stack of magnetic laminations tightly together in mutual alignment. Though the presence of keys 28 is not required insomuch as assembly of beams themselves to the core, as hereinafter described, may serve this holding function, their use does facilitate core handling during assembly.

Figure 2:
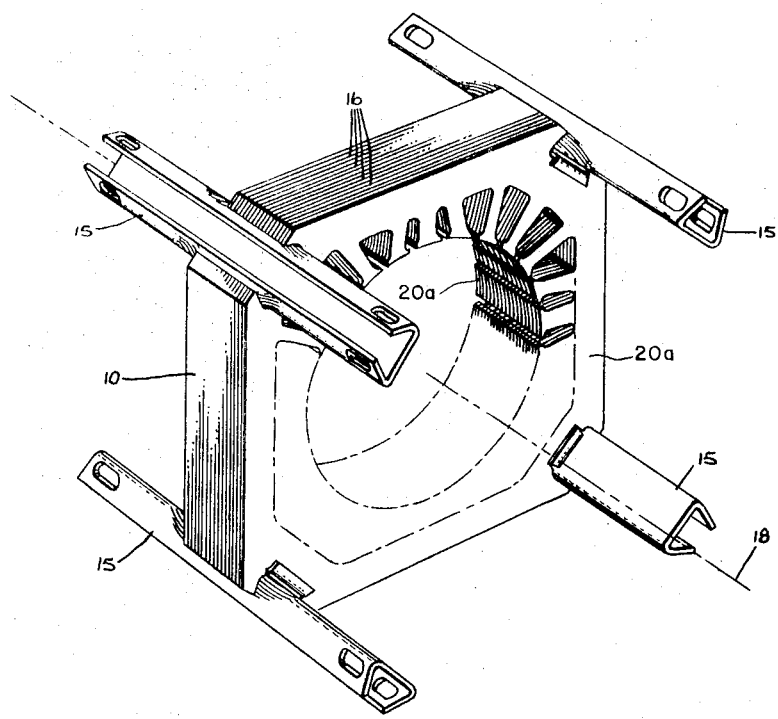
FIG. 2 is a perspective view of stator components of the electric motor shown in FIG. 1.
Figure 4:
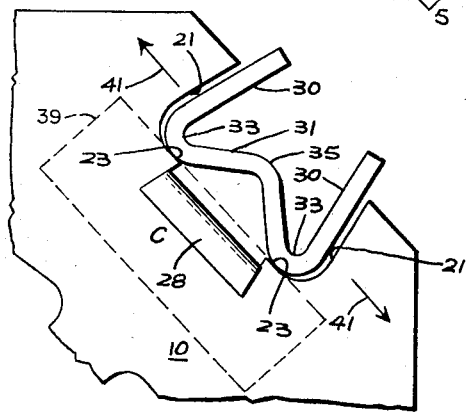
FIG. 4 is an enlarged fragmentary side view in elevation of a portion of the assembly shown in FIG. 3.
Figure 5:
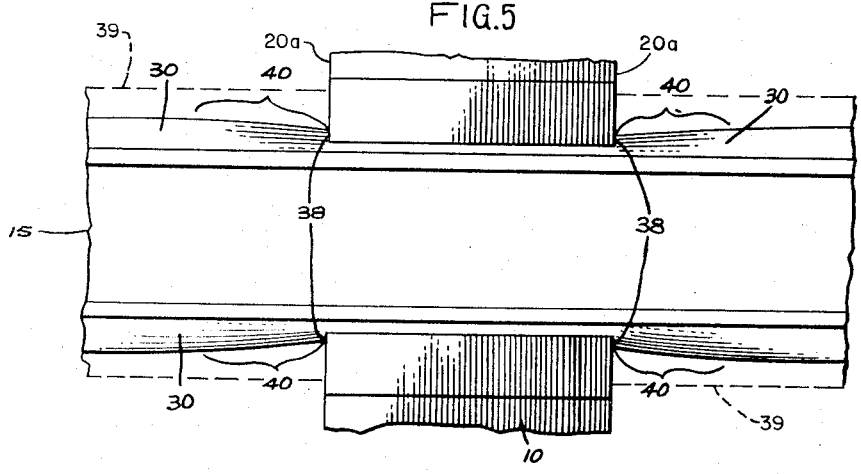
FIG. 5 is a plan view in elevation of a portion of the assembly shown in FIG. 3 taken along line 5—5.

Next, as may be most clearly seen by reference to groove C in FIGS. 3 and 4, rigid elongate beams 15 are disposed in grooves 20. Preferably, the beams are inserted coaxially of core axis 18 although radial insertion could be made as by twisting action with appropriate dimensioning of the beams with respect to the groove walls. Following insertion of the rigid beams their relative positions with respect to core 10 is as shown in FIG. 2.

With reference once again to groove C in FIGS. 3 and 4 upon insertion beams 15 are seen to have two elongate flange portions or sides 30 which integrally project from a corrugated beam web portion or deformable base 31. As flange portions 30 so project, they converge slightly towards one another. The corrugated web portion is seen to have two troughs 33 in contact with a portion of bottom wall 23, and to have deformable means, such as a ridge 35, therebetween. The beam web portion ridge is spaced from the groove bottom wall and from the key mounted in the recess therein.

In the next assembly step ridge 35 is moved or forced towards key 28 by suitable means, such as a press or the like well known in the art, causing web 31 to be deformed or generally flattened. As web 31 is flattened, troughs 33 diverge generally along the plane of the groove bottom wall 23 urging beam flanges 30 into contact with groove side walls 21 as shown by arrows 41 to assume the configuration seen by reference to groove D in FIG. 3. The resulting press or interference fit inhibits movement of beams 15 with respect to the core in any direction in the plane of the figure insomuch as side walls 21 inhibit tangential movement with respect to core axis 18, bottom wall 23 inhibits radial movement toward the core axis, and convergent side walls 21 inhibit outward radial movement.

In addition to beams 15 being fixed with respect to core 10 in the plane of FIG. 3, the beams are also so fixed in the direction normal to the plane of this figure. This is accomplished by not only flattening those portions of ridges 35 mounted within grooves 20 but also those oppositely extending portions of the beams which project out from stator end faces 20a. This action is preferably done simultaneously with the flattening of those ridge portions of the beam intermediate portions disposed within the grooves. This may be performed by positioning the projecting portions of beams 15 on an anvil 39, as shown in outline in FIGS. 4 and 5, disposed generally coextensively with groove bottom wall 23 and then pressing ridges 35 thereagainst. As a result, the opposite sides 30 of the projecting beam portions adjacent groove lips 38 are forced apart a slightly greater distance than the opposite sides of beams 15 disposed within the confines of the grooves. As a consequence, beam opposite flanges 30 generally at longitudinal portions 40 flare wherein at least a portion of the beam opposite flanges abut or engage with at least a portion of the stator end faces 20a immediately adjacent the juncture of the stator end faces and grooves 20 thereby longitudinally securing the beams with respect to the core.

With beams 15 now rigidly mounted to core 10, relative movement therebetween is inhibited omnidirectionally. A rotor may then be positioned in proper alignment within the cylindrical stator core bore with a rotor shaft extending longitudinally thereout along bore axis 18. Alignment may be accomplished by the use of angularly spaced positioning shims radially inserted temporarily therebetween for radial alignment and by the use of thrust collars mounted on the shaft for axial alignment. End shields 12 may then be loosely placed over the beam ends with the rotor shaft aligned within the end shield carrying bearings. The end shields may then be rigidly secured or attached to the beam ends by suitable means without introduction of significant radial misalignment between the rotor and stator.

It should be understood that the just described method merely illustrates principles of the invention. Many modifications may, of course, be made to the method of assembling the stator just described without departure from the spirit and scope of the invention as set forth in the following claims.

What I claim as new and desire to secure by Letters Patent of the United States is:

1. A method of assembling components of a dynamo-electric machine comprising the steps of:

a. disposing elongate beam means in a groove means extending between a pair of opposite end faces of a stationary member of the dynamoelectric machine with the beam means having a pair of oppositely extending end portions respectively projecting from the opposite end faces, an intermediate portion lying between said end faces, and ridge means extending along said beam means; and b. deforming the ridge means to displace the intermediate portion into engagement with the groove means and each of the end portions into engagement with at least a portion of the stationary member adjacent a junction of the opposite end faces with the groove means, respectively.

2. The method as set forth in claim 1, comprising the intermediate step of supporting the oppositely extending end portions at least adjacent the opposite end faces for effecting the displacement of the portions of the oppositely extending end portions during the deforming step.

3. The method as set forth in claim 1, comprising the intermediate step of providing means for supporting the oppositely extending end portions at least adjacent the opposite end faces, the ridge means being moved toward engagement with the supporting means during the deforming step.

4. The method as set forth in claim 1, comprising the additional step of attaching a structural component of the dynamoelectric machine to at least one of the oppositely extending end portions.

5. A method of assembling components of a dynamoelectric machine comprising the steps of:

a. disposing an elongate beam in an opening provided therefor extending between a pair of opposite end faces on a stator of the dynamoelectric machine with the beam having a pair of oppositely extending end portions respectively projecting from the opposite end faces and deformable means extending generally along the beam;

b. positioning the opposite end portions on supporting means and having the deformable means adjacent the supporting means; and c. deforming the deformable means in a direction generally toward the supporting means and displacing at least a part of each oppositely extending end portion into engagement with the opposite end faces adjacent the opening while also displacing at least another part of the beam within the opening into interferring-fit engagement with the stator within the opening.

6. A method of assembling an elongate beam having a deformable base integral with and interconnecting opposite sides thereof in groove means provided therefor adjacent the peripheral surface of a magnetic core and extending between opposite end faces thereof, the groove means having a base wall between confronting side walls comprising the steps of:

a. disposing an intermediate portion of the beam base and sides in the groove means respectively adjacent the base wall and side walls thereof with oppositely extending portions of the beam respectively projecting from the opposite end faces; and b. deforming the beam base at least generally adjacent the opposite end faces and displacing at least a part of the beam sides of each oppositely extending portion into displacement preventing engagement with the magnetic core end faces generally adjacent the juncture thereof with the groove means while also displacing at least a portion of the beam sides into interferring-fit engagement with the confronting side walls of the groove means.

7. The method as set forth in claim 6, comprising the intermediate step of supporting the base of the oppositely extending portions of the beams at least adjacent the opposite end faces for effecting the displacement of the beam sides of the oppositely extending portions.

8. The method as set forth in claim 6, wherein the base of the beam includes ridge means extending generally the entire length thereof, and wherein the deforming step further comprises moving the ridge means and effecting deformation thereof in a direction for urging the sides of the beam to their displaced positions.

* * * * *